US010358514B2

(12) United States Patent
Detournay et al.

(10) Patent No.: US 10,358,514 B2
(45) Date of Patent: Jul. 23, 2019

(54) PROCESS FOR THE POLYMERISATION OF OLEFINS

(71) Applicant: INEOS SALES (UK) LIMITED, Hampshire (GB)

(72) Inventors: Stephan Detournay, Stombeek-Bever (BE); Christophe Moineau, Nivelles (BE)

(73) Assignee: INEOS SALES (UK) LIMITED, Hampshire (GB)

( * ) Notice: Subject to any disclaimer, the term of this patent is extended or adjusted under 35 U.S.C. 154(b) by 247 days.

(21) Appl. No.: 15/352,684

(22) Filed: Nov. 16, 2016

(65) Prior Publication Data

US 2017/0058064 A1 Mar. 2, 2017

Related U.S. Application Data

(63) Continuation of application No. 13/508,903, filed as application No. PCT/EP2010/066557 on Nov. 1, 2010, now abandoned.

(30) Foreign Application Priority Data

Nov. 10, 2009  (EP) .................................... 09175489
Nov. 10, 2009  (EP) .................................... 09175490

(51) Int. Cl.
    *C08F 4/64*     (2006.01)
    *C08F 210/16*    (2006.01)
    *C08F 10/00*     (2006.01)

(52) U.S. Cl.
    CPC ............ *C08F 210/16* (2013.01); *C08F 10/00* (2013.01); *C08F 2500/07* (2013.01); *C08F 2500/12* (2013.01)

(58) Field of Classification Search
    CPC .... B01J 23/26; B01J 2523/67; B01J 2523/47; B01J 21/08; B01J 20/3204; B01J 37/0201; B01J 6/001; B01J 37/12; C08F 4/64; C08F 210/16

See application file for complete search history.

(56) References Cited

U.S. PATENT DOCUMENTS

| 4,151,122 A | 4/1979 | McDaniel et al. ............ 502/236 |
|---|---|---|
| 4,182,815 A | 1/1980 | McDaniel et al. |
| 4,397,769 A * | 8/1983 | McDaniel ................ B01J 23/26 502/256 |
| 4,402,864 A * | 9/1983 | McDaniel ............... C08F 10/00 502/171 |
| 5,426,082 A | 6/1995 | Marsden ....................... 502/235 |
| 7,271,122 B2 * | 9/2007 | Bodart ................... C08F 10/02 502/103 |
| 7,384,885 B2 * | 6/2008 | Roger ................... B01J 21/063 502/113 |
| 7,803,736 B2 * | 9/2010 | Rohde ................. C08F 210/16 502/242 |
| 9,006,363 B2 * | 4/2015 | Moineau ................ C08F 10/02 526/106 |
| 9,243,091 B2 * | 1/2016 | Moineau ................ C08F 10/02 |
| 2010/0069585 A1 * | 3/2010 | Bodart ................... C08F 10/00 526/113 |

FOREIGN PATENT DOCUMENTS

| DE | 102 57 740 A1 | 6/2004 |
|---|---|---|
| WO | WO 2006/088602 A2 | 8/2006 |
| WO | WO 2006/088602 A3 | 8/2006 |
| WO | WO 2007/118863 A1 | 10/2007 |

* cited by examiner

*Primary Examiner* — Rip A Lee
(74) *Attorney, Agent, or Firm* — Nixon & Vanderhye P.C.

(57) ABSTRACT

The present invention relates to a process for polymerization of olefins, in particular gas phase polymerization of olefins, with the aid of a supported chromium oxide based catalyst.

20 Claims, No Drawings

PROCESS FOR THE POLYMERISATION OF OLEFINS

This application is a continuation of application Ser. No. 13/508,903 filed May 14, 2012, now abandoned, which is a 371 of PCT/EP2010/066557 filed Nov. 1, 2010, which claims priority to European Patent Application Nos. 09175490.3 filed Nov. 10, 2009 and 09175489.5 filed Nov. 10, 2009, the entire contents of each of which are hereby incorporated by reference.

The present invention relates to a process for polymerisation of olefins, in particular gas phase polymerisation of olefins, with the aid of a supported chromium oxide based catalyst.

In particular, the present invention relates to a process for polymerisation of olefins, in particular gas phase polymerisation of olefins, with the aid of a supported chromium oxide based catalyst which has been subjected to a two-steps activation method.

The "two step activation" of supported chromium oxide catalysts, by which the catalyst is subject to a single activation in two steps, is well-known and commercially operated. In general, the two-step activation comprises heating the catalyst to a first temperature in a non-oxidising atmosphere (e.g. an inert or reducing gas) and subsequently lowering the temperature and replacing the non-oxidising gas with an oxidising one, usually air. The process is also known as "reduction and reoxidation activation" or "R&R activation", and is further described, for example, in McDaniel "A Review of the Phillips Supported Chromium Catalyst and Its Commercial Use for Ethylene Polymerization" in Advances in Catalysis, Vol. 53, Chapter 3, Section 12.4 "Commercial Practice".

Such activations are also described, for example, in U.S. Pat. No. 4,147,849, which discloses activation of a chromium containing catalyst under a non-oxidative atmosphere at an activation temperature of 600-2000° F. followed by subjecting the activated catalyst to an oxidative treatment at a lower, although still elevated, temperature.

A similar process is described in WO 2008/074467, albeit that at the highest temperature during the activation steps the catalyst is preferably exposed to an oxidising atmosphere. In particular, WO2008074467 discloses a process for producing chromium catalysts, comprising the steps of: a) applying one or more chromium compound(s) to a finely divided inorganic support to form a catalyst precursor, b) thermally treating the catalyst precursor, the step of thermally treating the catalyst precursor being carried out for at least part of the time in an oxidizing atmosphere and in such a manner that a maximum temperature of from 350° C. to 1050° C. is not exceeded, wherein the duration of the thermal treatment step at a temperature of above 300° C. is at least 1500 minutes.

Whilst, as exemplified by the prior art in the field, it is common general knowledge to produce polymers in gas phase in the presence of supported chromium oxide based catalyst, the man skilled in the art is still trying to obtain polymers with the right combination of product properties, particularly properties appropriate for pipe purposes, while still having a high productivity and avoiding production problems, e.g. fines and/or temperature upsets. Therefore, it would be desirable to obtain a resin product with desirable properties, e.g., sufficiently high Environmental Stress Crack Resistance (ESCR), high Creep behaviour and high resistance against rapid crack propagation with the right melt index (MI), while also achieving high catalyst activity, in particular using a gas phase process, more particularly a fluidized bed gas phase process.

It is therefore an objective of the present invention to provide a process for preparing ethylene (co-) polymers, preferably in gas phase, having high Environmental Stress Crack Resistance (ESCR) and high Creep behaviour in the presence of a supported chromium oxide based catalyst having good activity.

The subject of the invention is therefore a process for the polymerisation, preferably the gas phase polymerisation, of at least one alpha olefin containing from 2 to 12 carbon atoms in the presence of a supported chromium oxide based catalyst characterised in that
the supported chromium oxide based catalyst is a titanium modified supported chromium oxide based catalyst;
the chromium oxide based catalyst is supported on a refractory oxide; and
the titanium modified supported chromium oxide based catalyst has been subjected to a 2 steps thermal treatment wherein
the first step consists in bringing the catalyst under an inert atmosphere to a temperature comprised between 600 and 900° C. and then keeping the catalyst during a holding time of less than or equal to 8 hours under an inert atmosphere at a temperature comprised between 600 and 900° C., and
the second step consists in the treatment of the catalyst corning from step 1 under an oxidizing atmosphere, preferably air, at a temperature comprised between 400 and 700° C. during a holding time comprised between 2 and 10 hours, and
wherein the maximum temperature of step 2 is always lower than the maximum temperature of step 1 and wherein the difference between the maximum temperature of step 1 and the maximum temperature of step 2 is comprised between 50 and 250° C.

According to a preferred embodiment of the present invention, the raw catalyst or the activated catalyst itself is not contacted with an alkylboron compound before or during (co-) polymerization. Thus, preferably, the present invention does not contemplate the activation of our catalyst by a cocatalyst such as with an alkylboron.

The refractory oxide support for the chromium oxide based catalyst used in the process of the present invention is preferably a spherical and/or spheroidal refractory oxide. It can preferably be silica, alumina, aluminopflosphate, metal oxides such as oxides of titanium, zirconium, boron, zinc, magnesium, and the like, or combinations thereof; more preferably, it essentially consists of silica or more preferably silica doped with titanium, aluminium or boron.

The spherical and/or spheroidal refractory oxide support may suitably be prepared by spray drying of washed and aged hydrogel particles or spray setting of a hydrosol. Such processes are well known in the art and typically result in spherical and/or spheroidal particles. The particle size may be adjusted by selection of conditions. In this invention the median (volume) particle diameter of the spherical and/or spheroidal particles measured after drying is from 10 to 250 µm, preferably from 20 to 200 µm and most preferably from 20 to 150 µm. The International Standard ISO 13320:2009 ("Particle size analysis—Laser diffraction methods") can be used for measuring said median particle size characteristic. Particle diameters are indeed typically measured using light scattering techniques. For example, Malvern Instruments' laser diffraction systems can advantageously be used, e.g. a Malvern Mastersizer S or a Malvern Mastersizer 2000; such instrument together with its operating manual meets or even exceeds the requirements set-out within the ISO 13320 Standard. The resulting spherical and/or spheroidal particles may be further classified e.g. by sieving to tailor the median particle diameter and reduce the amounts of fine and/or coarse particles.

Although handling of the particles may lead to some degree of breakage, particles are preferably not subjected to any deliberate comminution processes.

Preferably, the spherical and/or spheroidal particles are prepared by spray setting of a hydrosol, preferably a silica hydrosol. The resulting spherical and or spheroidal hydrogel particles are suitably subjected to washing and aging processes prior to water removal to generate suitable surface area and pore volume.

In general, the support has a specific surface area ranging from 100 to 800 $m^2/g$, measured according to the BET volumetric method in British Standard BS 4359/1 (1984). Preferably, the specific surface area is more than or equal to 250 m2/g or even more than or equal to 400 $m^2/g$. The specific surface area is preferably less than or equal to 600 m2/g.

Moreover, the support generally has a pore volume higher than 1 mL/g. It may also be higher than 2 mL/g and even higher than 2.5 mL/g. The term "pore volume" should be understood to mean the pore volume measured according to the nitrogen penetration method (BET) with reference to British Standard BS 435911 (1984).

The chromium oxide based catalyst deposited on a support used in the process according to the invention usually contains approximately 0.3 to 2% by weight and even more particularly 0.3 to 1% by weight of chromium, more preferably between 0.3 and 0.7% by weight of chromium, most preferably between 0.4 and 0.6% by weight of chromium (these weights being expressed with respect to the weight of final supported catalyst). Of course, it is possible to use the catalyst as a blend of 2 different or more different catalysts, at least one on them being defined as hereinabove. It is also possible to use the catalyst as a blend of 2 different or more different catalysts, this blend containing a chromium loading in average defined as hereinabove.

Any known chromium containing compounds capable of reacting with the surface hydroxyl groups of the refractory oxide can be used in the process of preparation of the catalyst.

Non-limiting examples of such compounds include chromium nitrate, chromium trioxide, chromate esters such as chromium acetate, chromium acetylacetonate and t-butyl chromate, silyl chromate esters and phosphorous-containing esters, chromium chloride, chromium sulphate and ammonium chromate.

The introduction mode of this chromium compound can be a dry mixing in or outside the activator or by aqueous or non-aqueous impregnation of the support.

Any known titanium containing compound capable of reacting with the surface hydroxyl groups of the refractory oxide can be used in the process of preparation of the catalyst. These compounds include those having the structures $(R)mTi(OR')n$ and $(RO)mTi(OR')n$ where m is 1, 2, 3 or 4; n is 0, 1, 2 or 3 and m+n=4, and where R and R' are a C1 to C12 alkyl, aryl, cycloalkyl group, cyclopentadienyl, C2 to C12 alkenyl groups and combination thereof. These compounds also include those having the structures $TiX4$ wherein X is chlorine, bromine, fluorine or iodine. The titanium compound can be solid, liquid or in solution in an hydrocarbon solvent.

The introduction mode of the titanium compound can be a dry mixing in or outside the activator or an impregnation of the support with a hydrocarbon solution of the titanium compound. The catalyst used in the process according to the invention usually contains between 0.5 and 5% by weight of titanium, most preferably between 1.5 and 4%, most preferably between 2 and 4%, most preferably between 2 and 3% (these weights being expressed with respect to the weight of final supported catalyst).

The preferred method of preparation of the catalyst used in the present invention is not important as long as it has the chromium content, the titanium content and the spherical and/or spheroidal morphology as defined hereinabove. According to the present invention is the preparation of the catalyst is preferably not carried out by the cogel method. Although the support may contain small amounts of titanium, for instance as an impurity, the method of the invention involves the introduction of a titanium compound on to a support by addition and/or impregnation as defined herein in addition to any titanium contained within the support skeleton.

For the purpose of the present invention and appended claims, spheroidal shape means shaped like a sphere but not perfectly round, especially an ellipsoid shape that is generated by revolving one or more ellipse around one of its axes.

Thus, for the purpose of the present invention and appended claims, by "spherical and/or spheroidal refractory oxide", it is meant that the refractory oxide particles used for the preparation of the catalyst used in the present invention exhibit a spherical and/or spheroidal shape morphology. Such spherical and/or spheroidal morphology of said particles is usually identified by taking microscopy pictures of said particles; this is currently how the man skilled in the art can identify the presence of a spherical and/or spheroidal refractory oxide.

According to the present invention, the titanium modified supported chromium oxide based catalyst is then subjected to a 2 steps thermal treatment wherein the first step consists in bringing the catalyst under an inert atmosphere to a temperature comprised between 600 and 900° C. and then keeping the catalyst under said inert atmosphere and at said temperature comprised between 600 and 900° C. during a holding time of less than or equal to 8 hours, preferably less than or equal to 6 hours, for example less than or equal to 4 hours; such holding time is preferably of at least 30 minutes, more preferably at least 1 hour, for example at least 1.5 hours. Preferably the temperature described in this first step is at least 650° C., more preferably at least 700° C., for example at least 730° C.; such temperature is preferably less than or equal to 850° C., for example less than or equal to 800° C., and the second step consists in the treatment of the catalyst coming from step 1 under an oxidizing atmosphere, preferably air, at a temperature comprised between 400 and 700° C. during a holding time comprised between 2 and 10 hours. Such holding time lasts preferably at least 3 hours, more particularly at least 4 hours; such holding time is preferably less than or equal to 9 hours, more particularly less than or equal to 8 hours, for example less than or equal to 7 hours, More preferably the range of temperature described in this second step is comprised between 500 and 700° C. and more preferably comprised between 600 and 700° C., and wherein the maximum temperature of step 2 is always lower than the maximum temperature of step 1 and wherein the difference between the maximum temperature of step 1 and the maximum temperature of step 2 is comprised between 50 and 250° C., preferably comprised between 50 and 200° C. For example, such difference in temperatures is of at least 80° C., preferably at least 100° C. Such difference in temperatures is less than or equal to 250° C., preferably less than or equal 200° C.

Step 1 according to the present invention is performed under an inert atmosphere, preferably under nitrogen, more preferably under dry nitrogen. Any additional thermal treatment steps could also be performed before our step 1 as claimed hereinabove. However, it is preferred according to the present invention that the titanium modified supported chromium oxide based catalyst is not subjected to any other thermal treatment step at a temperature above 150'C before our step 1 as claimed in the present invention.

It is preferred according to the present invention that step 2 is performed directly after step 1 without any additional intermediate thermal treatment step.

After our claimed step 2 treatment, the activated catalyst is then preferably cooled with the same oxidizing atmosphere from step 2, preferably air, to a temperature between 400° C. and 300° C. and further cooled from this temperature to room temperature with inert atmosphere, preferably nitrogen, more preferably dry nitrogen.

Also, according to the present invention, it is preferred that the total duration of any thermal treatment (non oxidising and oxidising steps) above 300° C. of our titanium modified supported chromium oxide based catalyst is always less than 24 hours, preferably less than 22 hours, more preferably less 20 hours and even more preferably less than 18 hours.

It is obvious for the man skilled in the art that the thermal treatments according to the present invention can be performed continuously or in batch in any appropriate reactor. For continuous mode operations, a configuration with at least two reactors in series is preferred, one reactor operating under an inert atmosphere for our claimed step 1 and one reactor operating under an oxidising atmosphere for our claimed step 2.

According to an embodiment of the present invention, the 2 thermal treatment steps are performed in batch mode in the same reactor, preferably in a fluidized bed reactor.

According to another embodiment of the present invention, the step of bringing the catalyst under an inert atmosphere to a temperature comprised between 600 and 900° C. is performed by introducing the said catalyst into a reactor and gradually increasing the temperature of the reactor with a thermal speed rate comprised between 1 and 2.5° C./min until the desired temperature is reached.

According to the invention, the supported chromium catalysts modified with titanium having undergone the successive heat treatments in nitrogen and in air, under suitable conditions of temperature and duration, are used for the polymerization of ethylene or for its copolymerization with C3 to C8 olefins. By way of examples of olefins that can be used as comonomers mention may be made of propylene, 1-butene, 4-methyl-1-pentene, 1-hexene, 1-actene, 1-decene, 1-dodecene, styrene, and derivatives thereof. Of course, several olefins may be used simultaneously, particularly 1-butene and/or 1-hexene and/or 1-octene.

The process according to the invention applies particularly well to the manufacture of ethylene (co-) polymers but more particularly ethylene (co-) polymers having, after compounding:
 a density between 936 and 941 Kg/m and a MI5 between 0.5 and 1.2 dg/min and the pipes produced with this polymer meet the requirements of ISO 4427 and ISO 4437 in hydrostatic pressure testing at 20° C. and 9.0 MPa with a ductile failure at more than 100 hours, or
 a density between 942 and 946 Kg/m$^3$ and a MI5 between 0.4 and 0.6 dg/m in and the pipes produced with this polymer meet the requirements of ISO 4427 and ISO 4437 in hydrostatic pressure testing at 20° C. and 9.0 MPa with a ductile failure at more than 100 hours, or
 a density between 943 and 947 Kg/m$^3$ and a MI5 between 0.1 and 0.4 dg/min and the pipes made from this polymer and tested in hydrostatic pressure test at 20° C. under 12.0 MPa will have a time to failure at more than 100 h,
the above hydrostatic pressure testing being made following ISO1167-1 and 2.

The (co)polymerization is carried out, in a known manner, by bringing ethylene and, optionally, other olefins into contact with the catalyst under polymerizing conditions known per se. According to the present invention, the (co)polymerization of the ethylene is preferably carried out in the gas phase. Indeed, the Applicants have unexpectedly found that it was possible to obtain a resin product with desirable properties, e.g., sufficiently high Environmental Stress Crack Resistance (ESCR) and high Creep behaviour, with the right melt index (MI), while also achieving high catalyst activity, by using a gas phase process, in particular a fluidized bed gas phase process. Indeed, the ethylene (co)polymers produced according to the process of the present invention exhibit an excellent compromise between processability, slow crack and creep behaviour. They may be used in any conventional process for converting thermoplastics, such as, for example, pipe extrusion, blow moulding and blown film. They are very suitable for pipe extrusion.

The present invention also provides ethylene (co-) polymers but more particularly (co-) polymers having, after compounding:
 a density between 936 and 941 Kg/m$^3$ and a MI5 between 0.5 and 1.2 dg/min and the pipes produced with this polymer meet the requirements of ISO 4427 and ISO 4437 in hydrostatic pressure testing at 20° C. and 9.0 MPa with a ductile failure at more than 100 hours, or
 a density between 942 and 946 Kg/m$^3$ and a MI5 between 0.4 and 0.6 dg/min and the pipes produced with this polymer meet the requirements of ISO 4427 and ISO 4437 in hydrostatic pressure testing at 20° C. and 9.0 MPa with a ductile failure at more than 100 hours, or
 a density between 943 and 947 Kg/m$^3$ and a MI5 between 0.1 and 0.4 ds/min and the pipes made from this polymer and tested in hydrostatic pressure test at 20° C. under 12.0 MPa will have a time to failure at more than 100 h,
the above hydrostatic pressure testing being made following ISO1167-1 and 2, characterised in that the polymer is obtainable by a polymerisation process, preferably a gas phase polymerisation process, of at least one alpha olefin containing from 2 to 12 carbon atoms in the presence of a supported chromium oxide based catalyst wherein
 the supported chromium oxide based catalyst is a titanium modified supported chromium oxide based catalyst;
 the chromium oxide based catalyst is supported on a spherical and/or spheroidal refractory oxide; and
 the titanium modified supported chromium oxide based catalyst has been subjected to a 2 steps thermal treatment wherein
  the first step consists in bringing the catalyst under an inert atmosphere to a temperature comprised between 600 and 908° C. and maintaining the catalyst during a holding time of less than or equal to 8 hours under an inert atmosphere at a temperature comprised between 600 and 900° C., and the second step consists in the treatment of the catalyst coming from step 1 under an oxidizing atmosphere, preferably air, at a temperature comprised between 400 and 700'C during a time comprised between 2 and 10 hours, and wherein the maximum temperature of step 2 is always lower than the maximum temperature of step 1 and wherein the difference between the maximum temperature of step 1 and the maximum temperature of step 2 is comprised between 50 and 250° C.

The example which follows is intended to illustrate the process of the invention.

In a fluidized bed reactor, 15 g of the catalyst PQC35105 were subjected to the following thermal treatment:

increase of temperature up to 750° C. with a thermal speed rate of 1.5° C./min under nitrogen flow;
keeping temperature at 750° C. and keeping nitrogen flow during 1 hour;
decrease of temperature up to 650° C. under nitrogen flow;
at 650° C. switch from nitrogen flow to air flow;
keeping temperature at 650° C. and keeping air flow during 6 hours;
decrease of temperature, up to 350° C. under air flow;
at 350° C. switch from air flow to nitrogen flow;
decrease of temperature up to ambient temperature under nitrogen flow;
the catalyst was recovered under nitrogen and stored under nitrogen in a glove box before to be use for ethylene polymerization.

After a correct clean-up, 500 g of polyethylene pellets were introduced into a stainless steel reactor of capacity 5 liters equipped with a stirrer. Then the reactor was closed, heated at 100° C., stirred at 70 rpm and placed under vacuum during 1 hour. Then vacuum was stopped and replaced with nitrogen and the reactor was placed overnight under nitrogen flow at 100° C. Then the nitrogen flow was stopped and the reactor, stored under nitrogen and stirred at 300 rpm, was ready for the polymerization.

Next step was the addition of 150 mg of poison scavenger prepared with the silica 948 from the Grace Company treated under nitrogen flow at 600° C. during 5 hours and with 1.5 mmole/g of triethylaluminium.

Then the reactor was placed at 93° C. and 15 minutes after the poison scavenger addition, 260 mg of the C35105 catalyst prepared as described above, was added. Then 3 bars of hydrogen was introduced in the reactor. Then ethylene and hexene were introduced to reach 7 bars of ethylene and a ratio hexene/ethylene of 1.2 mol/mol % controlled by mass spectrometry. Ethylene and hexene were fed during the reaction to maintain the reactor pressure constant and to maintain the ratio of hexene/ethylene of 1.2 mol/mol % always controlled by mass spectrometry.

The duration of the polymerization was 119 min during which period 654 g of polyethylene. This corresponds to a productivity of 2515 g/g and a catalytic activity of 181 g/g/h/b. The reactor content was cooled to 25° C. and were then recovered from the reactor. A sieve with 2 mm diameter mesh was used to separate the polyethylene pellets from the powder formed during the reaction. The recovered polymer powder had the following properties:

Melt Index MI5=0.6
Density MVS=938.5 Kg/m$^3$

Melt index MI5 is measured using to standard ISO 1133 at a temperature of 190° C. under load of 5 Kg.

Density is measured according to the standard ISO 1183-1 (Method A) and the sample plaque was prepared according to the standard ASTM D4703 (Condition C) where it was cooled under pressure at a cooling rate of 15° C./min from 190° C. to 40° C. The hydrostatic pressure testing mentioned above is described in standard ISO 1167-1 and ISO 1167-2.

The invention claimed is:

1. Process for the manufacture of an ethylene co-polymer having, after compounding:

a density between 936 and 941 kg/m$^3$ and a MI5 between 0.5 and 1.2 dg/min and the pipes produced with this ethylene copolymer meet the requirements of ISO 4427 and ISO 4437 in hydrostatic pressure testing at 20° C. and 9.0 MPa with a ductile failure at more than 100 hours, or a density between 942 and 946 kg/m$^3$ and a MI5 between 0.4 and 0.6 dg/min and the pipes produced with this ethylene copolymer meet the requirements of ISO 4427 and ISO 4437 in hydrostatic pressure testing at 20° C. and 9.0 MPa with a ductile failure at more than 100 hours, or a density between 943 and 947 kg/m$^3$ and a MI5 between 0.1 and 0.4 dg/min and the pipes made from this ethylene copolymer and tested in hydrostatic pressure testing at 20° C. under 12.0 MPa have a time to failure at more than 100 hours, the above hydrostatic pressure testing being carried out following ISO1167-1 and 2, and the process comprising bringing ethylene and one or more other olefins into contact with a titanium modified supported chromium oxide based catalyst under polymerizing conditions, wherein the titanium modified supported chromium oxide based catalyst is supported on a refractory oxide and has been subjected to a two step thermal treatment wherein the first step consists of bringing the catalyst under an inert atmosphere to a temperature between 600 and 900° C. and then keeping the catalyst during a holding time of less than or equal to 8 hours under an inert atmosphere at a temperature between 600 and 900° C., and the second step consists of treating the catalyst from the first step under an oxidizing atmosphere at a temperature between 400 and 700° C. during a holding time between 2 and 10 hours, and wherein a maximum temperature of the second step is lower than a maximum temperature of the first step and wherein a difference between the maximum temperature of the first step and the maximum temperature of the second step is between 50 and 250° C., and further wherein the preparation of the catalyst is not carried out by a cogel method and involves the introduction of a titanium compound on to a support by addition and/or impregnation.

2. Process according to claim 1 wherein the refractory oxide is spherical and/or spheroidal.

3. Process according to claim 2 wherein the spherical and/or spheroidal refractory oxide consists of silica.

4. Process according to claim 1 wherein the titanium modified supported chromium oxide based catalyst contains 0.3 to 2% by weight of chromium.

5. Process according to claim 1 wherein the titanium modified supported chromium oxide based catalyst contains between 0.5 and 5% by weight of titanium.

6. Process according to claim 1 wherein a holding time during the first step of thermal treatment is less than or equal to 6 hours and is at least 30 minutes.

7. Process according to claim 1 wherein the temperature of the first step of thermal treatment is at least 650° C. and is less than or equal to 850° C.

8. Process according to claim 1 wherein the second step has a holding time of at least 3 hours and is less than or equal to 9 hours.

9. Process according to claim 1 wherein the temperature of the second step is between 500 and 700° C.

10. Process according to claim 1 wherein the difference between the maximum temperature of the first step and the maximum temperature of the second step is between 50 and 200° C.

11. Process according to claim 1 wherein the first step is performed under nitrogen.

12. Process according to claim 1 wherein a total duration of any thermal treatment (non oxidising and oxidising steps) above 300° C. of the titanium modified supported chromium oxide based catalyst is less than 24 hours.

13. Process according to claim 1 which is a process for the gas phase polymerisation of ethylene.

14. Process according to claim 1 wherein ethylene is copolymerised with one or more C3 to C8 olefins.

15. Process according to claim 1 wherein the oxidising atmosphere of the second step is air.

16. Process according to claim 4 wherein the titanium modified supported chromium oxide based catalyst contains 0.3 to 1% by weight of chromium.

17. Process according to claim 5 wherein the titanium modified supported chromium oxide based catalyst contains between 1.5 and 4% of titanium.

18. Process according to claim 7 wherein the temperature of the first step of thermal treatment is at least 700° C. and is less than or equal to 800° C.

19. Process according to claim 9 wherein the temperature of the second step is between 600 and 700° C.

20. Process according to claim 10 wherein the difference between the maximum temperature of the first step and the maximum temperature of the second step is between 100 and 200° C.

* * * * *